(12) United States Patent
Gillott

(10) Patent No.: US 11,035,969 B2
(45) Date of Patent: Jun. 15, 2021

(54) MARINE DIFFRACTION SURVEY FOR SMALL OBJECT DETECTION

(71) Applicant: Magseis FF LLC, Houston, TX (US)

(72) Inventor: Graham Gillott, Arona (IT)

(73) Assignee: Magseis FF LLC, Houston, TX (US)

( * ) Notice: Subject to any disclaimer, the term of this patent is extended or adjusted under 35 U.S.C. 154(b) by 0 days.

(21) Appl. No.: 16/446,376

(22) Filed: Jun. 19, 2019

(65) Prior Publication Data

US 2020/0400848 A1    Dec. 24, 2020

(51) Int. Cl.
*G01V 1/38* (2006.01)
*B63B 21/66* (2006.01)

(52) U.S. Cl.
CPC ............ *G01V 1/3808* (2013.01); *B63B 21/66* (2013.01); *B63B 2211/02* (2013.01); *G01V 2210/1293* (2013.01); *G01V 2210/1423* (2013.01); *G01V 2210/64* (2013.01)

(58) Field of Classification Search
CPC ......... G01V 1/3808; G01V 2210/1423; G01V 2210/64; G01V 2210/1293; B63B 21/66; B63B 2211/02
USPC .......................................................... 367/93
See application file for complete search history.

(56) References Cited

U.S. PATENT DOCUMENTS

| | | | | |
|---|---|---|---|---|
| 2003/0088372 A1* | 5/2003 | Caulfield | ............... | G01V 13/00 702/40 |
| 2010/0097886 A1* | 4/2010 | Day | ..................... | G01V 1/3808 367/24 |
| 2015/0149093 A1* | 5/2015 | Pan | .......................... | G01V 1/28 702/14 |
| 2016/0077227 A1* | 3/2016 | Lockwood | ............. | G01V 1/137 367/15 |
| 2019/0146113 A1* | 5/2019 | Dudley | ................ | G05D 1/0206 367/15 |
| 2020/0073000 A1* | 3/2020 | Rogers | ................. | G01V 1/3808 |
| 2020/0108898 A1* | 4/2020 | Martin | .................... | B63B 1/285 |

FOREIGN PATENT DOCUMENTS

| | | |
|---|---|---|
| GB | 2 460 073 A | 11/2009 |
| GB | 2460073 A * | 11/2009 |
| WO | WO-2018/208168 A1 | 11/2018 |

OTHER PUBLICATIONS

International Search Report and Written Opinion for PCT/US2019/044030 dated May 29, 2020 (13 pages).

* cited by examiner

*Primary Examiner* — Hirdepal Singh
(74) *Attorney, Agent, or Firm* — Foley & Lardner LLP; James De Vellis

(57) ABSTRACT

A seabed object detection system is provided. The system can include a receiver array. The receiver array can include a plurality of receivers disposed on a plurality of streamers. The plurality of streamers can include a central port side streamer, a central starboard side streamer, an auxiliary port side streamer and an auxiliary starboard side streamer. The system can include a source array. The source array can include a plurality of sources. The plurality of sources can include a central port side source, a central starboard side source, an auxiliary port side source, and an auxiliary port side streamer.

18 Claims, 9 Drawing Sheets

MARINE DIFFRACTION SURVEY FOR SMALL OBJECT DETECTION

BACKGROUND

Seismic or other operations performed on a piece of earth can identify subterranean characteristics or features of the analyzed piece of earth.

SUMMARY

At least one aspect of the present disclosure is directed to a seabed object detection system which can include a receiver array. The receiver array can include a plurality of receivers. The plurality of receivers can receive diffraction data diffracted off an object in a seabed. The plurality of receivers can be disposed on a plurality of streamers. The plurality of streamers can include a central pair of streamers. The central pair of streamers can include a central port side streamer and a central starboard side streamer. The plurality of streamers can include at least one auxiliary port side streamer located a first distance from the central pair of streamers. The plurality of streamers can include at least one auxiliary starboard side streamer located a second distance from the central pair of streamers opposite the at least one auxiliary port side streamer. The seabed object detection system can include a source array which can include a plurality of sources. The plurality of sources can generate a source shot. The plurality of sources can include at least one central pair of sources. The at least one central pair of sources can include a central port side source and a central starboard side source. The central pair of sources can be located between the central pair of streamers. The plurality of sources can include at least one auxiliary port side source. The at least one auxiliary port side source can be located between the central port side streamer and the at least one auxiliary port side streamer. The plurality of sources can include at least one auxiliary starboard side source. The at least one auxiliary starboard side source can be located between the central starboard side streamer and the at least one auxiliary starboard side streamer.

At least one aspect of the present disclosure is direct to a method of seabed object detection. The method can include providing a receiver array. The receiver array can include a plurality of receivers. The plurality of receivers can receive diffraction data diffracted off an object in a seabed. The plurality of receivers can be disposed on a plurality of streamers. The plurality of streamers can include a central pair of streamers. The central pair of streamers can include a central port side streamer and a central starboard side streamer. The plurality of streamers can include at least one auxiliary port side streamer located a first distance from the central pair of streamers. The plurality of streamers can include at least one auxiliary starboard side streamer located a second distance from the central pair of streamers opposite the at least one auxiliary port side streamer. The method can include providing a source array. The source array can include a plurality of sources. The plurality of sources can generate a source shot. The plurality of source can include at least one central pair of sources. The at least one central pair of sources can include a central port side source and a central starboard side source. The at least one central pair of sources can be located between the central pair of streamers. The plurality of sources can include at least one auxiliary port side source. The at least one auxiliary port side source can be located between the central port side streamer and the at least one auxiliary port side streamer. The plurality of sources can include at least one auxiliary starboard side source. The at least one auxiliary starboard side source can be located between the central starboard side streamer and the at least one auxiliary starboard side streamer.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

Like reference numbers and designations in the various drawings indicate like elements.

DETAILED DESCRIPTION

Reflection-based surveys can obtain information relating to subsurface features. An acoustic signal can reflect off subsurface lithological formations and be acquired, analyzed and interpreted. However, reflection-based surveys typically cover a narrow area and collect a sparse set of data, both of which are factors that contribute to an increased time required to complete the surveys. Additionally, small shallow objects such as boulders buried in the seabed may be difficult to precisely image due to the resolution capabilities of reflection-based surveys. These small objects can complicate or delay wind turbine, marine or ocean bottom constructions that are fixed to the seabed, as well as the placement of cable connections and communication lines between these wind turbine, marine or ocean bottom constructions.

The present disclosure is directed to systems and methods for seabed object detection. Due to the limitations of reflection-based surveys, it can be challenging to detect small shallow objects in the seabed. Inefficiencies related to increased survey time, such as a greater risk of weather-based delays, can increase the operating cost of these surveys without providing an accurate map of obstacles in the seabed. Systems and methods of the present disclosure can solve these and other problems associated with performing a survey to detect seabed objects.

The present disclosure is directed to systems and methods for seabed object detection. For example, the seabed object detection system can provide an accurate map of obstacles in the seabed. The system can include a receiver array. The receiver array can include a plurality of receivers disposed on a plurality of streamers. The plurality of streamers can include a central port side streamer, a central starboard side streamer, an auxiliary port side streamer and an auxiliary starboard side streamer. The system can include a source array. The source array can include a plurality of sources. The plurality of sources can include a central port side source, a central starboard side source, an auxiliary port side source, and an auxiliary port side streamer.

Figure 1:
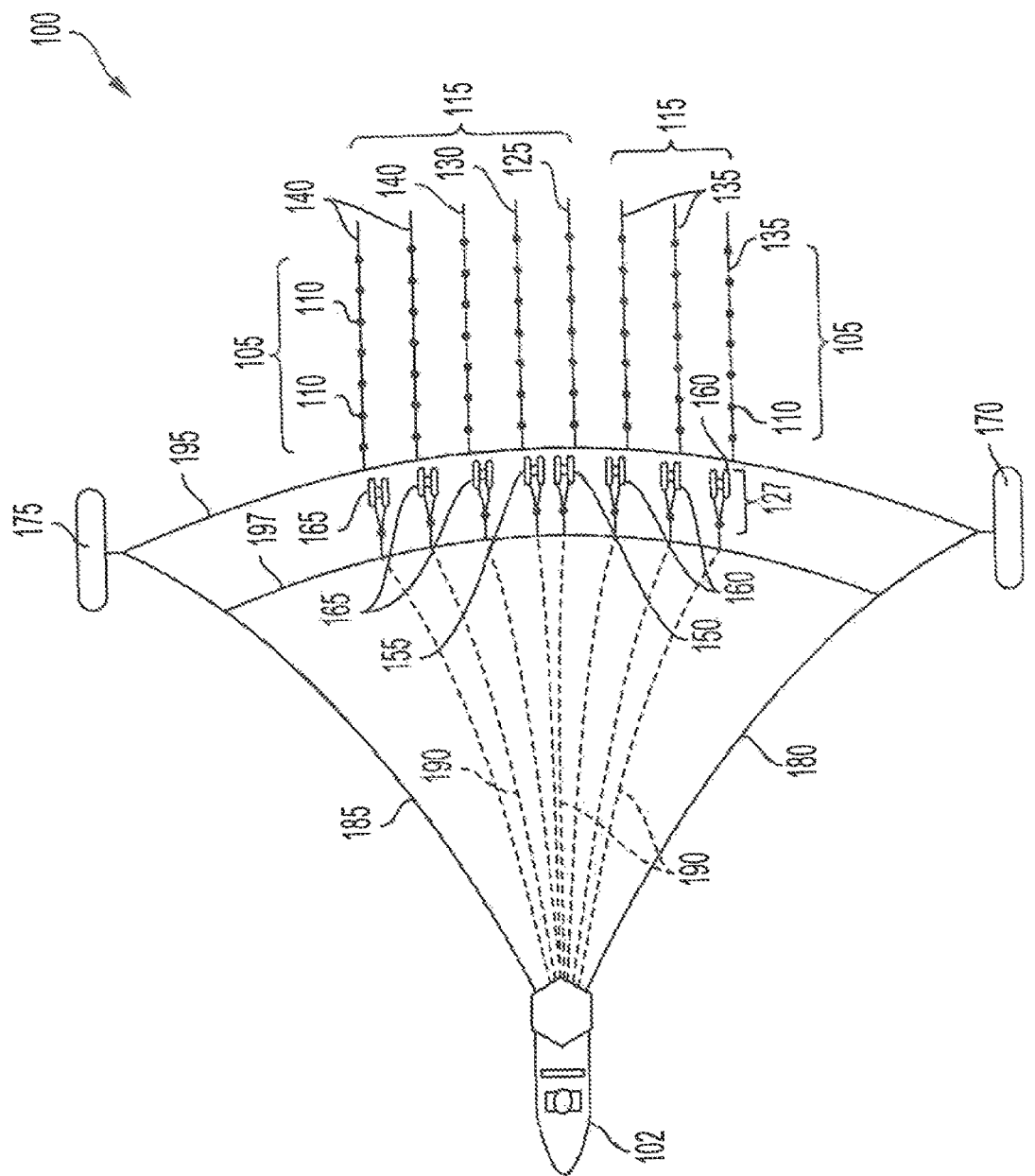
FIG. 1 illustrates a seabed object detection system according to an example implementation.

FIG. 1 illustrates an example seabed object detection system 100 illustrative of a marine environment in which the systems and methods of the present disclosure can perform a seismic survey to detect seabed objects. The seabed object detection system 100 can include a receiver array 105. The receiver array 105 can include a plurality of receivers 110. The plurality of receivers 110 can be disposed on a plurality of streamers 115. A streamer of the plurality of streamers 115 may be a cable (e.g., a surface marine cable), an assembly of wires, or any component capable of connecting a receiver to a recording device which may be located on a vessel 102. The receiver array 105 can include one or more receivers. For example, the receiver array 105 can include a plurality of receivers 110 coupled to a plurality of streamers 115. The receiver array 105 can include a pattern of receivers. For example, the plurality of receivers 110 can be coupled to the plurality of streamers 115 along a line. The plurality of receivers 110 of the receiver array 105 can be coupled to the plurality of streamers 115 in a grid pattern. The receiver array 105 can be the pattern formed by the plurality of receivers 110 disposed on the plurality of streamers 115. For example, the receiver array 105 can include a plurality of receivers 110 disposed along a streamer of the plurality of streamers 115. The receiver array 105 can include a plurality of receivers 110 disposed on multiple streamers of the plurality of streamers 115. The receiver array 105 can receive diffraction data diffracted off an object in the seabed.

The receiver array 105 can include a plurality of receivers 110. The plurality of receivers 110 can receive diffraction data diffracted off an object in a seabed. For example, a receiver of the plurality of receivers 110 may be a hydrophone or any other device capable of collecting seismic data. Seismic data can include reflection data indicating subsurface features of the seabed. Seismic data can include diffraction data indicating subsurface features of the seabed. The subsurface features of the seabed can include small shallow objects such as boulders. The small shallow objects can be between 10 cm and 100 cm wide (e.g., 20 cm, 30 cm, 40 cm, 50 cm, 60 cm, 70 cm, 80 cm, 90 cm, 100 cm). The small shallow objects can be greater than 100 cm. These small shallow objects can be less than 10 cm. The plurality of receivers 110 can be configured to detect acoustic waves that are reflected by seabed objects. The plurality of receivers 110 can be configured to detect acoustic waves that are diffracted by seabed objects. The plurality of receivers 110 can detect diffraction data from edges of objects. For example, the plurality of receivers 110 can detect diffraction data originating from edges of large objects. The large objects can have a volume of between 100 and 500 cubic meters (e.g., 100 cubic meters, 200 cubic meters, 300 cubic meters, 400 cubic meters, 500 cubic meters). The large objects can have a volume of less than 100 cubic meters. The large objects can have a volume of greater than 100 cubic meters. The large object can be a shipping container. The diffraction data can originate from corners of the shipping container. The plurality of receivers 110 can detect objects with irregular surface features. For example, the plurality of receivers 110 can detect objects with facets, edges, sharp boundaries, or textures. The seabed objects can be completely buried within the seabed. The seabed objects can be partially buried within the seabed.

The plurality of streamers 115 can include a central pair of streamers. The central pair of streamers can include a central port side streamer 125 and a central starboard side streamer 130. The central port side streamer 125 may be a cable (e.g., a surface marine cable), an assembly of wires, or any component capable of connecting a receiver to a recording device which may be located on the vessel 102. The recording device can receive data, such as reflection and diffraction data, from the plurality of receivers 110 disposed on the plurality of streamers 115. The central port side streamer 125 may be disposed on a port side of the vessel 102. The central starboard side streamer 130 may be a cable (e.g., a surface marine cable), an assembly of wires, or any component capable of connecting a receiver to a recording device which may be located on the vessel 102. The central starboard side streamer 130 may be disposed on a starboard side of the vessel 102.

The plurality of streamers 115 can include an auxiliary port side streamer 135. The auxiliary port side streamer 135 can be located a first distance from the central pair of streamers. For example, the auxiliary port side streamer 135 can be located a first distance from the central port side streamer 125. The auxiliary port side streamer 135 can be located a first distance from the central starboard side streamer 130. The first distance can include distances between about 5 meters and 30 meters. For example, the first distance can be 12.5 meters. The first distance can be less than 5 meters. The first distance can be greater than 30 meters. The auxiliary port side streamer 135 may be a cable (e.g., a surface marine cable), an assembly of wires, or any component capable of connecting a receiver to a recording device which may be located on the vessel 102. The auxiliary port side streamer 135 may be disposed on a port side of the vessel 102. The plurality of streamers 115 can include multiple auxiliary port side streamers 135. For example, the plurality of streamers 115 can include one, two, three, or more auxiliary port side streamers 135.

The plurality of streamers 115 can include an auxiliary starboard side streamer 140. The auxiliary starboard side streamer 140 can be located a second distance from the central pair of streamers. For example, the auxiliary starboard side streamer 140 can be located a second distance from the central port side streamer 125. The auxiliary starboard side streamer 140 can be located a second distance from the central starboard side streamer 130. The second distance can include distances between about 5 meters and 30 meters. For example, the second distance can be 12.5 meters. The second distance can be less than 5 meters. The second distance can be greater than 30 meters. The second distance can be approximately the same as the first distance. The auxiliary starboard side streamer 140 may be a cable (e.g., a surface marine cable), an assembly of wires, or any component capable of connecting a receiver to a recording device which may be located on the vessel 102. The auxiliary starboard side streamer 140 may be disposed on a starboard side of the vessel 102. The auxiliary starboard side streamer 140 can be located opposite the auxiliary port side streamer 135. The plurality of streamers 115 can include multiple auxiliary starboard side streamers 140. For example, the plurality of streamers 115 can include one, two, three, or more auxiliary starboard side streamers 140. The plurality of streamers 115 can include exactly eight streamers. For example, the plurality of streamers 115 can include one central port side streamer 125, one central starboard side streamer 130, three auxiliary port side streamers 135, and three auxiliary starboard side streamers 140.

The seabed object detection system 100 can include a source array 127. The source array 127 can include a plurality of sources. The plurality of sources can include a central port side source 150, a central starboard side source 155, an auxiliary port side source 160, and an auxiliary starboard side source 165. A source of the plurality of sources can generate a source shot. A source of the plurality of sources can generate acoustic waves. The source array 127 can generate an acoustic signal to be received by the receiver array 105. For example, the source array 127 can include a plurality of sources coupled to a source cable 197. The source array can include a pattern of sources. The sources can include a central port side source 150, a central starboard side source 155, an auxiliary port side source 160, and an auxiliary starboard side source 165. For example, the central port side source 150, the central starboard side source 155, the auxiliary port side source 160, and the auxiliary starboard side source 165 can be coupled to the source cable 197 to form a source array 127.

The source array 127 can include at least one central pair of sources. The source array 127 can include a central pair of sources. The central pair of sources can include a central port side source 150 and a central starboard side source 155. The central pair of sources can be located between the central pair of streamers. For example, the central port side source 150 can be located between the central port side streamer 125 and the central starboard side streamer 130. The central port side source 150 can generate a source shot. The central port side source 150 can generate acoustic waves. The central port side source 150 can generate acoustic waves to be reflected off a seabed object and received by the plurality of receivers 110. The central port side source 150 can generate acoustic waves to be diffracted off a seabed object and received by the plurality of receivers 110. The central starboard side source 155 can be located between the central port side streamer 125 and the central starboard side streamer 130. The central starboard side source 155 can generate a source shot. The central starboard side source 155 can generate acoustic waves. The central starboard side source 155 can generate acoustic waves to be reflected off a seabed object and received by the plurality of receivers 110. The central starboard side source 155 can generate acoustic waves to be diffracted off a seabed object and received by the plurality of receivers 110.

The source array 127 can include at least one auxiliary port side source 160. The source array can include an auxiliary port side source 160. The auxiliary port side source 160 can be located between the central port side streamer 125 and the auxiliary port side streamer 135. The auxiliary port side source 160 can be located between a first auxiliary port side streamer 135 and a second auxiliary port side streamer 135. The auxiliary port side source 160 can generate a source shot. The auxiliary port side source 160 can generate acoustic waves. The auxiliary port side source 160 can generate acoustic waves to be reflected off a seabed object and received by the plurality of receivers 110. The auxiliary port side source 160 can generate acoustic waves to be diffracted off a seabed object and received by the plurality of receivers 110. The source array 127 can include multiple auxiliary port side sources 160. For example, the source array 127 can include one, two, three, or more auxiliary port side sources 160.

The source array 127 can include at least one auxiliary starboard side source 165. The auxiliary starboard side source 165 can be located between the central starboard side streamer 130 and the auxiliary starboard side streamer 140. The auxiliary starboard side source 165 can be located between a first auxiliary starboard side streamer 140 and a second auxiliary starboard side streamer 140. The auxiliary starboard side source 165 can generate a source shot. The auxiliary starboard side source 165 can generate acoustic waves. The auxiliary starboard side source 165 can generate acoustic waves to be reflected off a seabed object and received by the plurality of receivers 110. The auxiliary starboard side source 165 can generate acoustic waves to be diffracted off a seabed object and received by the plurality of receivers 110. The source array 127 can include multiple auxiliary starboard side source 165. For example, the source array 127 can include one, two, three, or more auxiliary starboard side source 165. The plurality of sources can include exactly eight sources. For example, the plurality of sources can include one central port side source 150, one central starboard side source 155, three auxiliary port side sources 160, and three auxiliary starboard side sources 165.

The seabed object detection system 100 can include a port side diverter 170. The port side diverter 170 may be a diverter, a paravane or deflecting plate that redirects the motion of water past the diverter laterally to produce an amount of lateral force. The diverter can be configured to redirect flow of water past the diverter with respect to a direction of motion of the diverter through water. The diverter can include a steering device associated with the diverter. The steering device can redirect the flow of water to control an amount of lateral force generated by the diverter. The port side diverter 170 can be connected by a cable to a starboard side diverter 175. The cable can include a streamer cable 195. For example, the port side diverter 170 can be directed connected or coupled to the streamer cable 195. The port side diverter 170 can be connected or coupled to the streamer cable 195 by a coupling device or a secondary cable. The coupling device can couple the port side diverter 170 to the streamer cable 195. The streamer cable 195 can be connected to the plurality of streamers 115. The plurality of streamers 115 can be connected or coupled to the streamer cable 195 by a coupling device or a secondary cable. The coupling device can couple the streamer cable 195 to the plurality of streamers 115.

The seabed object detection system 100 can include a starboard side diverter 175. The starboard side diverter 175 may be a diverter, a paravane or deflecting plate that redirects the motion of water past the diverter laterally to produce an amount of lateral force. The diverter can be configured to redirect flow of water past the diverter with respect to a direction of motion of the diverter through water. The diverter can include a steering device associated with the diverter. The steering device can redirect the flow of water to control an amount of lateral force generated by the diverter. The starboard side diverter 175 can be connected by a cable to a port side diverter 170. The cable can include a streamer cable 195. For example, the starboard side diverter 175 can be directed connected or coupled to the streamer cable 195. The starboard side diverter 175 can be connected or coupled to the streamer cable 195 by a coupling device or a secondary cable. The coupling device can couple the starboard side diverter 175 to the streamer cable 195. The streamer cable 195 can be connected to the plurality of streamers 115. The plurality of streamers 115 can be connected or coupled to the streamer cable 195 by a coupling device or a secondary cable. The coupling device can couple the streamer cable 195 to the plurality of streamers 115.

The seabed object detection system 100 can include a vessel 102. The vessel 102 can tow the receiver array 105.

The vessel 102 can tow the source array 127. The vessel 102 can tow the source array 127 ahead of the receiver array 105. The vessel 102 can be connected to the port side diverter 170. The vessel 102 can be connected to the port side diverter 170 by a port side cable 180. The vessel 102 can be coupled to the port side diverter 170. The vessel 102 can be coupled to the port side diverter 170 by the port side cable 180. The port side cable 180 may be a surface marine cable, an assembly of wires, or any component capable of connecting a receiver to a recording device which may be located on the vessel 102. The port side cable 180 may be a power cable to transmit electrical power from the vessel 102 to the plurality of sources or the plurality of receivers 110. The vessel 102 can be connected to the starboard side diverter 175. The vessel 102 can be connected to the starboard side diverter 175 by a starboard side cable 185. The vessel 102 can be coupled to the starboard side diverter 175. The vessel 102 can be coupled to the starboard side diverter 175 by the starboard side cable 185. The starboard side cable 185 may be a surface marine cable, an assembly of wires, or any component capable of connecting a receiver to a recording device which may be located on the vessel 102. The starboard side cable 185 may be a power cable to transmit electrical power from the vessel 102 to the plurality of sources or the plurality of receivers 110. The vessel 102 can tow the receiver array 105 and the source array 127 such that the receiver array 105 receives diffraction data diffracted off an object in the seabed. The diffraction data diffracted off the object in the seabed can include diffracted waves generated by the source array 127. The source array 127 can generate an acoustic signals to diffract off the object in the seabed.

The seabed object detection system 100 can include a streamer cable 195. The streamer cable 195 can connect the port side diverter 170 to the starboard side diverter 175. The streamer cable may be a surface marine cable, an assembly of wires, or any component capable of connecting a receiver to a recording device which may be located on the vessel 102. The streamer cable 195 can be coupled to the port side diverter 170. The streamer cable 195 can be coupled to the starboard side diverter 175. The streamer cable 195 can be multiple cables. For example, the streamer cable 195 can be multiple cables coupled together to form a longer cable. The streamer cable 195 can be connected to the central port side streamer 125. The streamer cable 195 can be connected to the central starboard side streamer 130. The streamer cable 195 can be connected to the auxiliary port side streamer 135. The streamer cable 195 can be connected to the auxiliary starboard side streamer 140.

The streamer cable 195 can be a power cable to transmit electrical power from the vessel 102 to the plurality of receivers 110. The streamer cable 195 can transmit electrical power from the vessel 102 to a receiver disposed on the central port side streamer 125. The streamer cable 195 can transmit electrical power from the vessel 102 to a receiver disposed on the central starboard side streamer 130. The streamer cable 195 can transmit electrical power from the vessel 102 to a receiver disposed on the auxiliary port side streamer 135. The streamer cable 195 can transmit electrical power from the vessel 102 to a receiver disposed on the auxiliary starboard side streamer 140.

The seabed object detection system 100 can include a source cable 197. The source cable 197 can connect the port side cable 180 to the starboard side cable 185. The source cable 197 can couple to the port side cable 180 at a point closer to the port side diverter 170 than to the vessel 102. The source cable 197 can couple to the starboard side cable 185 at a point closer to the starboard side diverter 175 than to the vessel 102. The source cable 197 can be directly connected or coupled to the port side cable 180. The source cable 197 can be directly connected or coupled to the starboard side cable 185. The source cable 197 can be connected to the source array 127. The source cable 197 can be directly connected or coupled to the source array 127. The source cable 197 can be connected to the central port side source 150. The source cable 197 can be connected to the central starboard side source 155. The source cable 197 can be connected to the auxiliary port side source 160. The source cable 197 can be connected to the auxiliary starboard side source 165. The source cable 197 can be connected to the central port side source 150 through a secondary cable. The source cable 197 can be connected to the central starboard side source 155 through a secondary cable. The source cable 197 can be connected to the auxiliary port side source 160 through a secondary cable. The source cable 197 can be connected to the auxiliary starboard side source 165 through a secondary cable.

The source cable 197 can be a power cable to transmit electrical power from the vessel 102 to the plurality of sources. The source cable 197 can transmit electrical power from the vessel 102 to the central port side source 150. The source cable 197 can transmit electrical power from the vessel 102 to the central starboard side source 155. The source cable 197 can transmit electrical power from the vessel 102 to the auxiliary port side source 160. The source cable 197 can transmit electrical power from the vessel 102 to the auxiliary starboard side source 165.

The seabed object detection system 100 can include a plurality of power cables 190. The power cable 190 can include an electrical cable to transmit electrical power. The power cable 190 can transmit electrical power from the vessel 102 to the plurality of sources of the source array 127. The power cable 190 can transmit electrical power from the vessel 102 to the central port side source 150. The power cable 190 can transmit electrical power from the vessel 102 to the central starboard side source 155. The power cable 190 can transmit electrical power from the vessel 102 to the auxiliary port side source 160. The power cable 190 can transmit electrical power from the vessel 102 to the auxiliary starboard side source 165.

Figure 2:
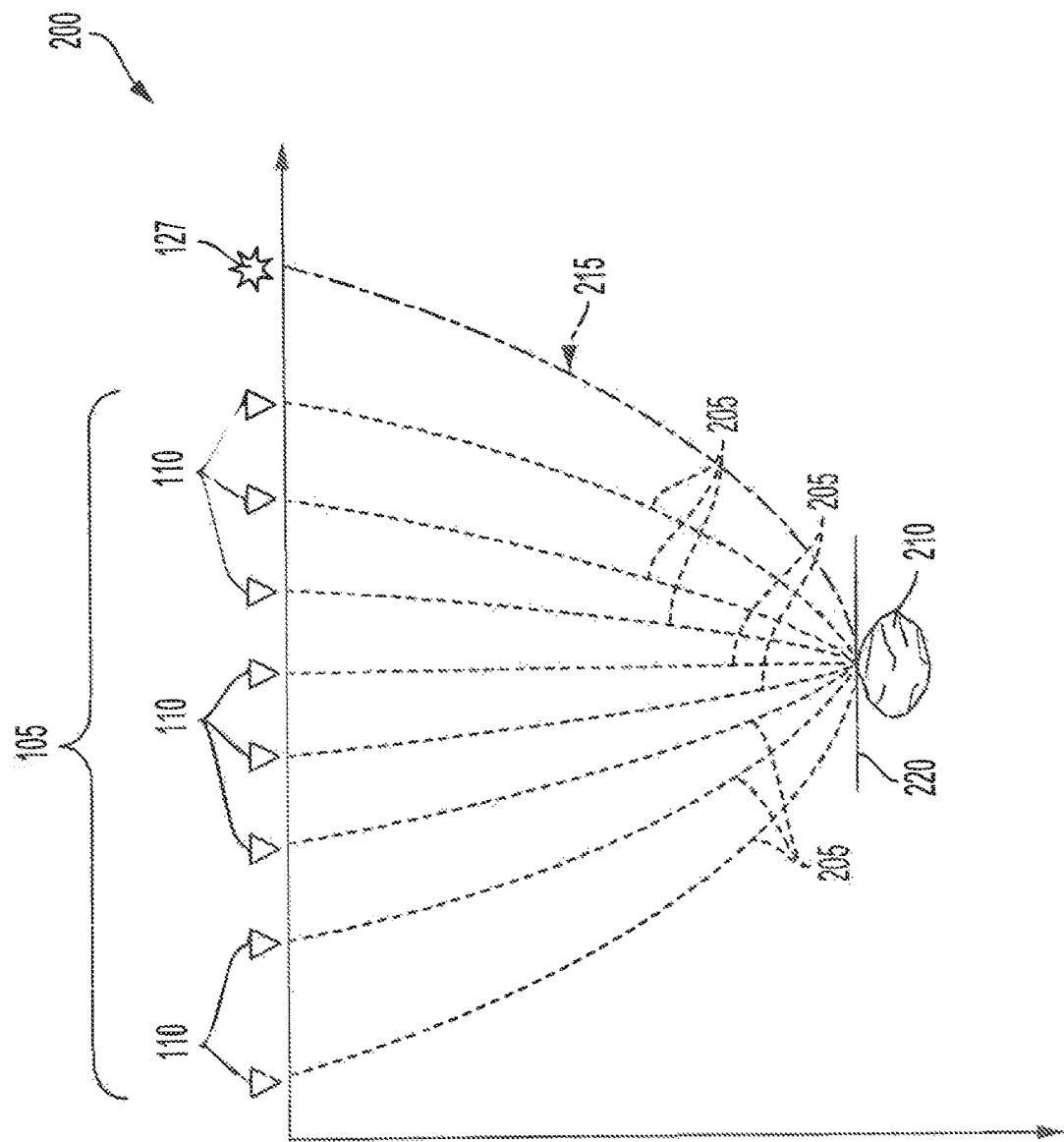
FIG. 2 illustrates a diffraction survey according to an example implementation.

FIG. 2 illustrates a diffraction survey 200. The diffraction survey 200 can include a receiver array 105 and a source array 127. The source array 127 can generate a source shot 215. The source shot 215 can travel through a medium (e.g., sea water) and diffract off a seabed object 210. The seabed object 210 can be completed buried in the seabed 220. The seabed object 210 can be partially buried in the seabed 220. The seabed object 210 can include small shallow objects such as boulders. The small shallow objects can be between 10 cm and 100 cm wide (e.g., 20 cm, 30 cm, 40 cm, 50 cm, 60 cm, 70 cm, 80 cm, 90 cm, 100 cm). The small shallow objects can be greater than 100 cm. These small shallow objects can be less than 10 cm. The waves that diffract off the seabed object 210 may include diffraction data. The diffraction data may include diffracted waves 205. The receiver array 105 can receive diffraction data. For example, the receiver array 105 can receive the diffracted waves 205. The plurality of receivers 110 of the receiver array 105 can receive diffraction data. For example, the plurality of receivers 110 can receive the diffracted waves 205. A receiver of the plurality of receivers 110 can receive the diffracted waves 205. The diffraction data can include diffracted waves 205 originating from a seabed object. The diffraction data can include diffracted waves 205 generated from a source shot 215. The plurality of receivers 110 can detect diffraction data from edges of objects. For example, the plurality of receivers 110 can detect diffraction data originating from edges of large objects. The large objects can have a volume of between 100 and 500 cubic meters (e.g., 100 cubic meters, 200 cubic meters, 300 cubic meters, 400 cubic meters, 500 cubic meters). The large objects can have a volume of less than 100 cubic meters. The large objects can have a volume of greater than 100 cubic meters. The large object can be a shipping container. The diffraction data can originate from corners of the shipping container. The plurality of receivers 110 can detect objects with irregular surface features. For example, the plurality of receivers 110 can detect objects with facets, edges, sharp boundaries, or textures.

The plurality of receivers 110 of the receiver array 105 can receive diffraction data. The diffraction data can include diffracted waves 205 diffracted off a seabed object that is smaller than a Fresnel zone. The Fresnel zone is an area of a reflected from which most of the energy of a reflection is returned and arrival times of the reflection differ by less than half a period from an arrival of energy propagated from an energy source. Waves with such arrival times may interfere constructively and be detected by a single arrival. Therefore, detecting reflection waves from an object smaller than the Fresnel zone may be difficult. However, the plurality of receivers 110 of the receiver array 105 can detect diffracted waves from an object smaller than the Fresnel zone.

The source array 127 can generate acoustic waves. The acoustic waves can include a source shot 215. The acoustic waves can diffract off the object in the seabed. The receiver array 105 can receive diffracted waves originating from the object in the seabed. The central pair of sources can generate acoustic waves. The central port side source 150 can generate acoustic waves. The central starboard side source 155 can generate acoustic waves. The auxiliary port side source 160 can generate acoustic waves. The auxiliary starboard side source 165 can generate acoustic waves. A receiver of the plurality of receivers 110 of the receiver array 105 can receive the diffracted waves. A receiver disposed on the central port side streamer 125 can receive the diffracted waves. A receiver disposed on the central starboard side streamer 130 can receive the diffracted waves. A receiver disposed on the auxiliary port side streamer 135 can receive the diffracted waves. A receiver disposed on the auxiliary starboard side streamer 140 can receive the diffracted waves.

Figure 3:
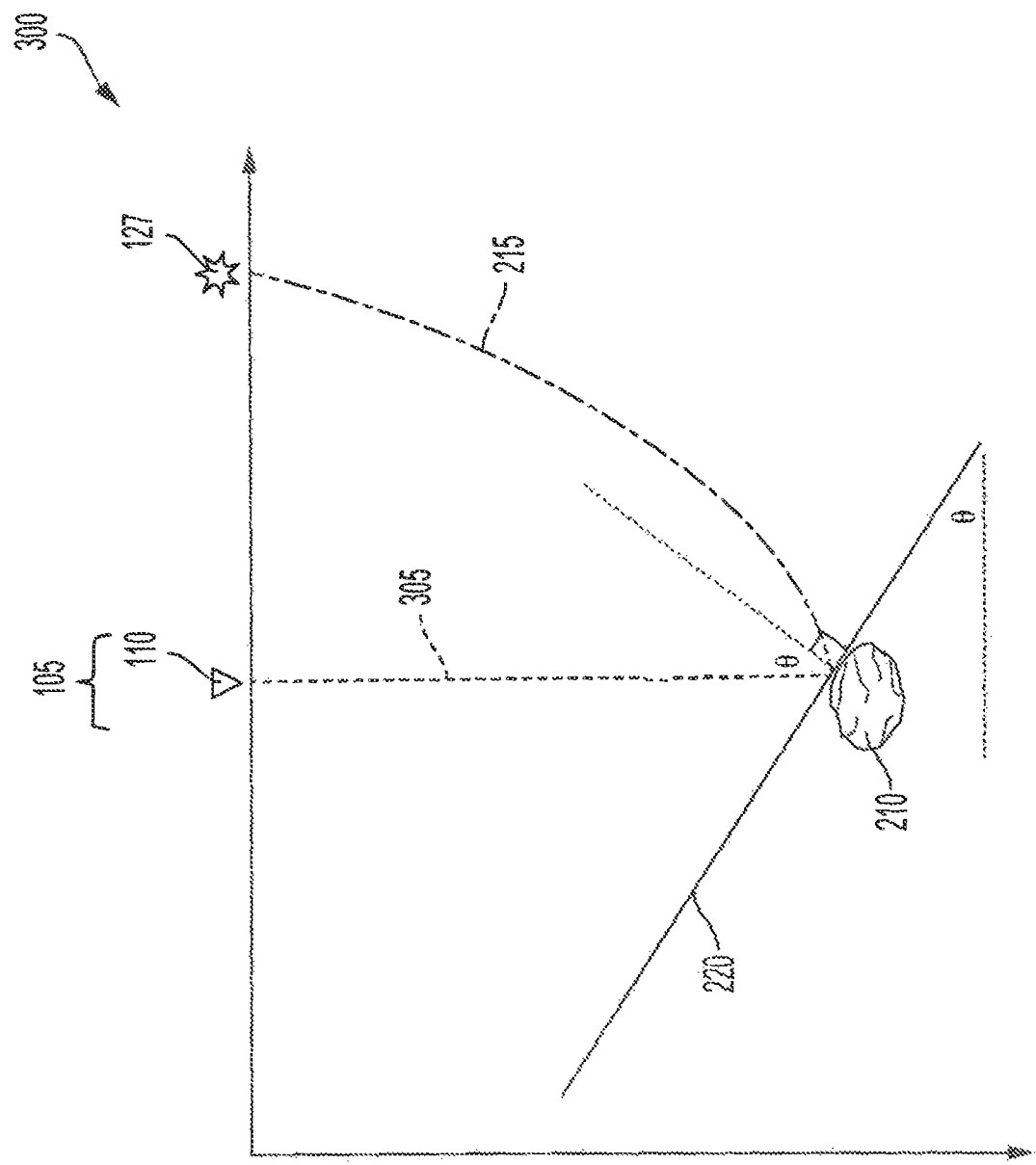
FIG. 3 illustrates a reflection survey according to an example implementation.

FIG. 3 illustrates a reflection survey 300. The reflection survey 300 can include a receiver array 105 and a source array 127. The source array 127 can generate a source shot 215. The source shot 215 can travel through a medium (e.g., sea water) and reflect off a seabed object 210. The seabed object 210 can be completed buried in the seabed 220. The seabed object 210 can be partially buried in the seabed 220. The seabed object 210 can include small shallow objects such as boulders. The small shallow objects can be between 10 cm and 100 cm wide (e.g., 20 cm, 30 cm, 40 cm, 50 cm, 60 cm, 70 cm, 80 cm, 90 cm, 100 cm). The small shallow objects can be greater than 100 cm. These small shallow objects can be less than 10 cm. The waves that reflect off the seabed object 210 may include reflection data. The reflection data may include a reflected wave 305. The receiver array 105 can receive reflection data. For example, the receiver array 105 can receive the reflected wave 305. A receiver of the plurality of receivers 110 can receive the reflected wave 305. The reflection data can include a reflected wave 305 originating from a seabed object. The reflection data can include the reflected wave 305 generated from a source shot 215. The plurality of sources of the source array 127 can generate an acoustic signal. The plurality of receivers 110 of the receiver array 105 can receive reflection data reflected off the object in the seabed. The reflection data can include a reflected wave 305. A receiver of the plurality of receivers 110 can receive the reflected wave 305 reflected off the object in the seabed and generated by a source of the plurality of sources of the source array 127.

Figure 4:
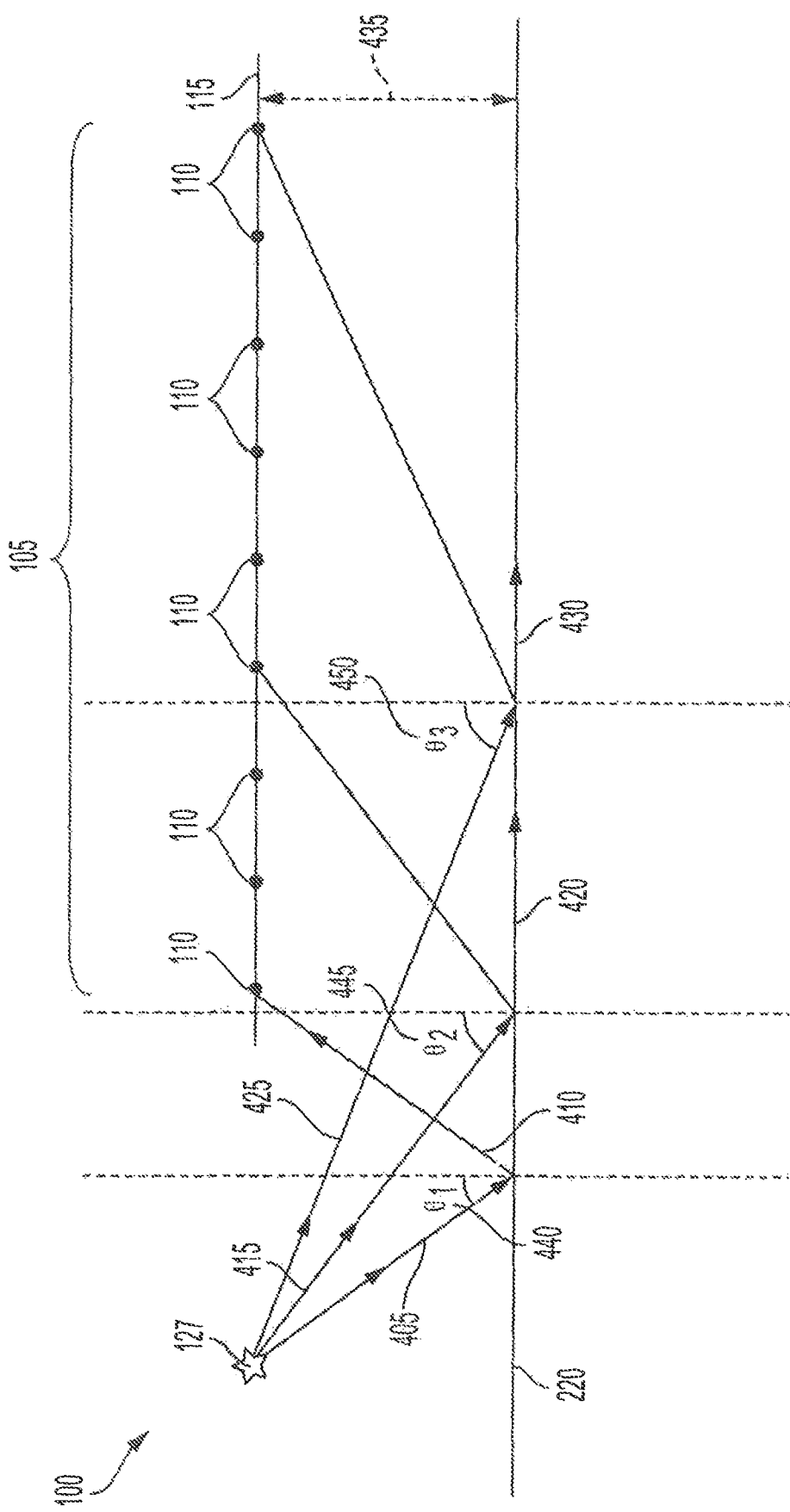
FIG. 4 illustrates a seabed object detection system according to an example implementation.

FIG. 4 illustrates a seabed object detection system 100. The seabed object detection system 100 can include a source array 127 and a receiver array 105. The source array 127 can generate a first source shot 405. The source array 127 can generate a second source shot 415. The source array 127 can generate a third source shot 425. The first source shot 405 can reflect off the seabed 220 at an angle, $\theta_1$ 440. The receiver array 105 can receive the wave reflected off the seabed 220 at an angle, $\theta_1$ 440. A receiver of the plurality of receivers 110 can receive the wave reflected off the seabed 220 at an angle, $\theta_1$ 440. The wave reflected off the seabed 220 can be a reflected wave 410. The angle, $\theta_1$ 440 can be less than a critical angle of reflection for a source of the source array 127.

The second source shot 415 can reflect off the seabed 220 at an angle, $\theta_2$ 445. For example, the angle, $\theta_2$ 445 can be a critical angle of reflection for the source of the source array 127. Instead of a wave reflected off the seabed 220, a refracted wave 420 is generated from the second source shot 415. The critical angle can include a critical angle of reflection. The critical angle can include a critical angle of incidence. The critical angle of incidence is the angle at which a refracted wave travels along an interface between two media. The critical angle can depend on a distance 435 between the seabed 220 and the receiver array 105. The distance 435 can be between 10 m and 100 meters. For example, the distance can be 15 m, 25 m, 50 m, or 75 m. The distance 435 can be less than 10 m. The distance 435 can be greater than 100 meters. The receiver array 105 does not receive a wave reflected off the seabed 220 at an angle, $\theta_2$ 445. A receiver of the plurality of receivers 110 does not receive a wave reflected off the seabed 220 at an angle, $\theta_2$ 445. A receiver of the plurality of receivers 110 can be disposed at a critical angle of reflection for a source of the source array 127. A receiver of the plurality of receivers 110 can be disposed at a critical angle of reflection for a source of the plurality of sources of the source array 127. The receiver disposed at a critical angle of reflection can receive diffraction data responsive to an acoustic source. The receiver disposed at a critical angle of reflection can receive diffraction data generated from the second source shot 415. The second source shot 415 can generate acoustic waves. The receiver disposed at a critical angle of reflection can receive diffraction data generated from the acoustic waves.

The third source shot 425 can reflect off the seabed 220 at an angle, $\theta_3$ 450. For example, the angle, $\theta_3$ 450 can be greater than a critical angle of reflection for the source of the source array 127. Instead of a wave reflected off the seabed 220, a refracted wave 430 is generated from the third source shot 425. The receiver array 105 does not receive a wave reflected off the seabed 220 at an angle, $\theta_3$ 450. A receiver of the plurality of receivers 110 does not receive a wave reflected off the seabed 220 at an angle, $\theta_3$ 450. A receiver of the plurality of receivers 110 can be disposed beyond a critical angle of reflection for a source of the source array 127. A receiver of the plurality of receivers 110 can be disposed beyond a critical angle of reflection for a source of the plurality of sources of the source array 127. The receiver disposed beyond a critical angle of reflection can receive diffraction data responsive to an acoustic source. The receiver disposed beyond a critical angle of reflection can receive diffraction data generated from the third source shot 425. The third source shot 425 can generate acoustic waves. The receiver disposed beyond a critical angle of reflection can receive diffraction data generated from the acoustic waves.

The receiver array 105 can be disposed a distance 435 above the seabed 220. For example, the receiver array 105 can be disposed 15 m to 50 m above the seabed (e.g., 15 m, 25 m, 40 m, 50 m). The receiver array 105 can be disposed at a distance 435 less than 15 m above the seabed. The receiver array 105 can be disposed at a distance 435 greater than 50 meters above the seabed. The plurality of receivers 110 of the receiver array 105 can be disposed a distance 435 above the seabed 220. Each receiver of the plurality of receivers 110 can be disposed at the substantially the same distance 435 above the seabed 220. The receiver array 105 can be disposed a distance below the sea surface. The plurality of receivers 110 of the receiver array 105 can be disposed a distance below the sea surface. The source array 127 can be disposed a distance above the seabed 220. For example, the source array 127 can be disposed 15 m to 50 m above the seabed. The receiver array 105 can be towed deeper than the source array 127.

Figure 5:
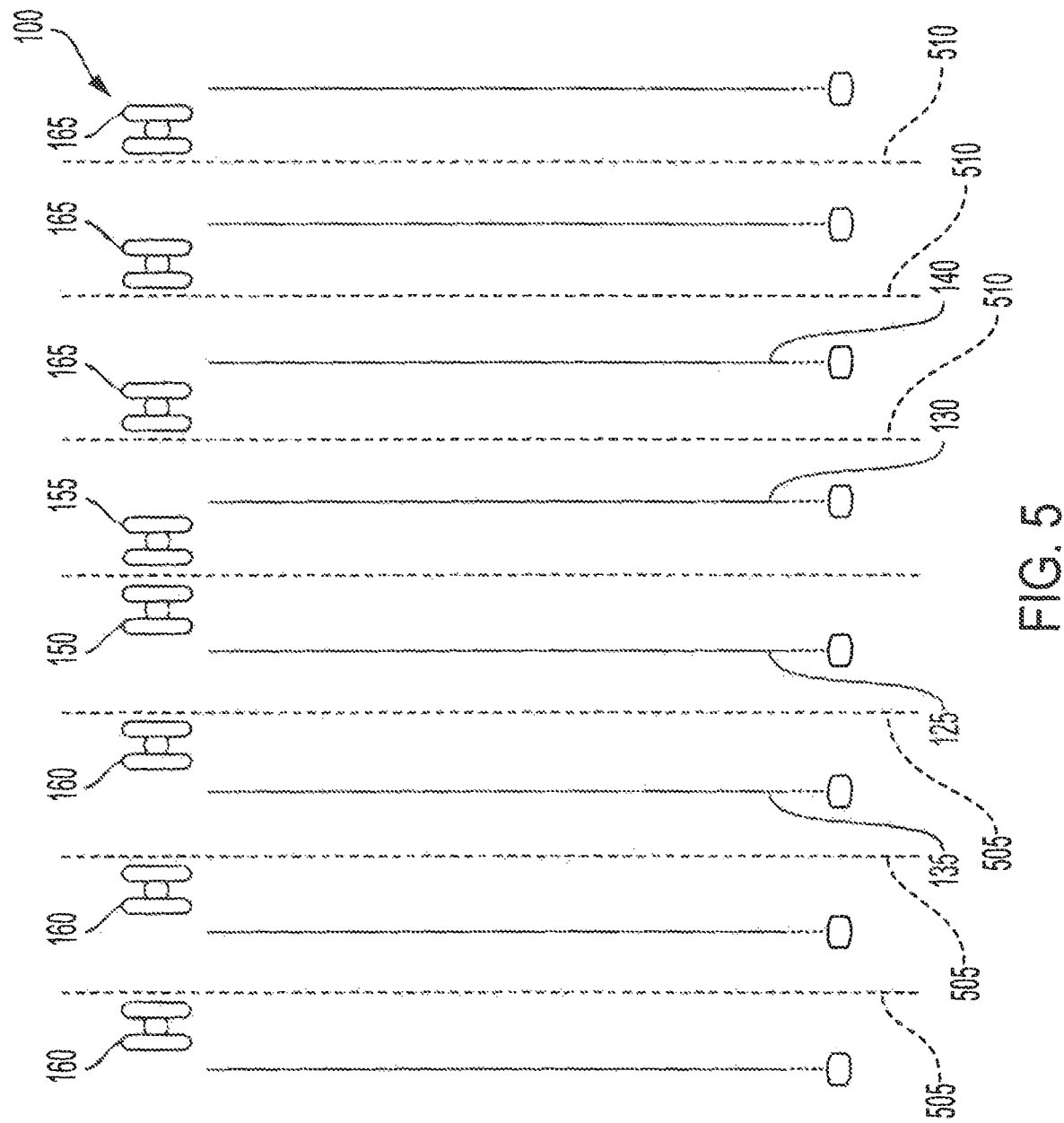
FIG. 5 illustrates a seabed object detection system according to an example implementation.

FIG. 5 illustrates a seabed object detection system 100. The seabed object detection system 100 can include an auxiliary port side source 160. For example, the auxiliary port side source 160 can be located between the central port side streamer 125 and a midline 505 of the central port side streamer 125 and an auxiliary port side streamer 135. The auxiliary port side source 160 can be located on a midline 505 of the central port side streamer 125 and an auxiliary port side streamer 135. The auxiliary port side source 160 can be located between a first auxiliary port side streamer 135 and a second auxiliary port side streamer 135. The auxiliary port side source 160 can be located between a first auxiliary port side streamer 135 and a midline 505 of the first auxiliary port side streamer 135 and the second auxiliary port side streamer 135. The auxiliary port side source 160 can be located between a second auxiliary port side streamer 135 and a third auxiliary port side streamer 135. The auxiliary port side source 160 can be located between a second auxiliary port side streamer 135 and a midline 505 of the second auxiliary port side streamer 135 and the third auxiliary port side streamer 135.

The seabed object detection system 100 can include an auxiliary starboard side source 165. For example, the auxiliary starboard side source 165 can be located between the central starboard side streamer 130 and a midline 505 of the central port side streamer 125 and an auxiliary port side streamer 135. The auxiliary starboard side source 165 can be located on a midline 510 of the central starboard side streamer 130 and an auxiliary starboard side streamer 140. The auxiliary starboard side source 165 can be located between a first auxiliary starboard side streamer 140 and a second auxiliary starboard side streamer 140. The auxiliary starboard side source 165 can be located between a first auxiliary starboard side streamer 140 and a midline 515 of the first auxiliary starboard side streamer 140 and the second auxiliary starboard side streamer 140. The auxiliary starboard side source 165 can be located between a second auxiliary starboard side streamer 140 and a third auxiliary starboard side streamer 140. The auxiliary starboard side source 165 can be located between a second auxiliary starboard side streamer 140 and a midline 515 of the second auxiliary starboard side streamer 140 and the third auxiliary starboard side streamer 140.

Figure 6:
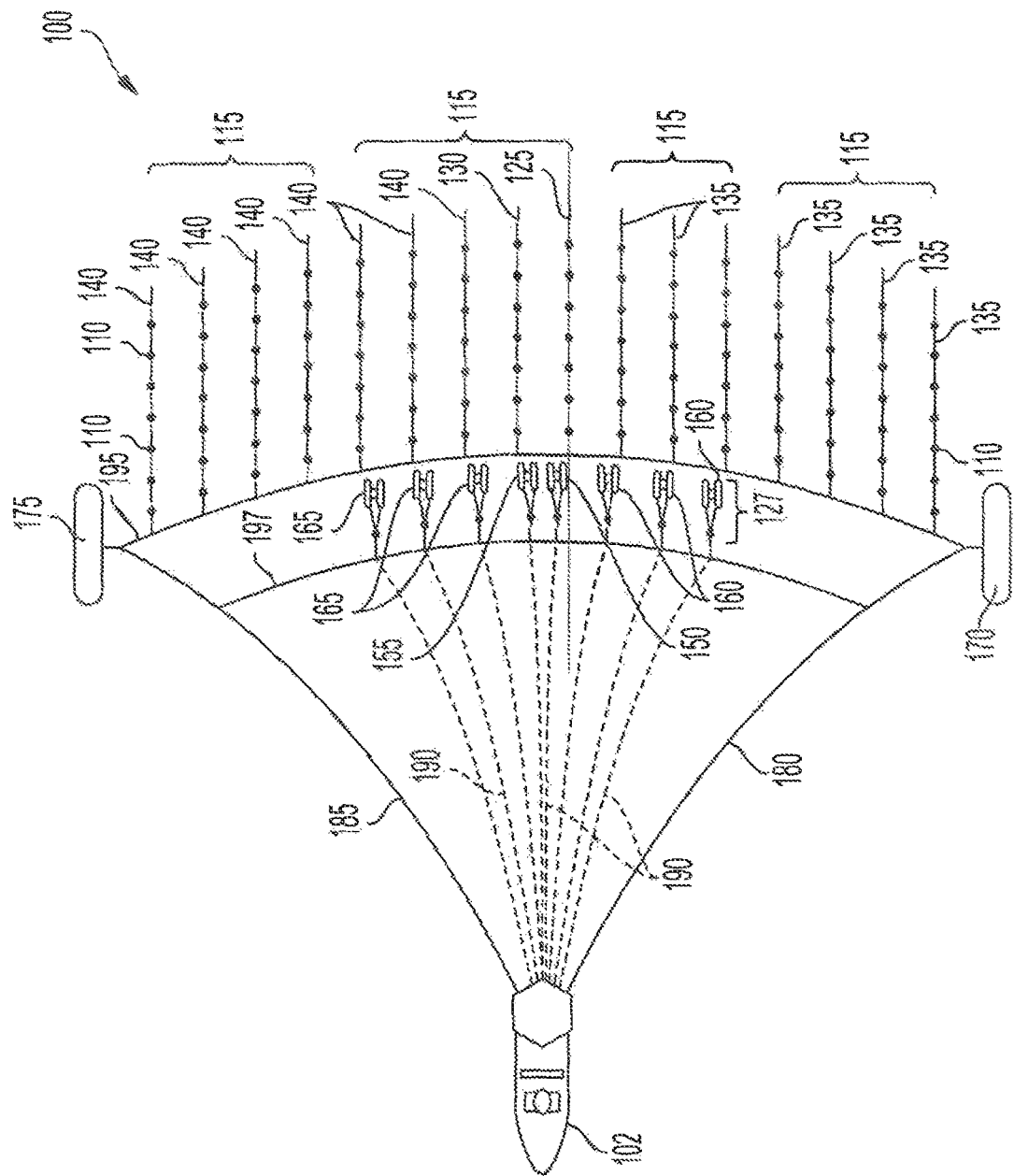
FIG. 6 illustrates a seabed object detection system according to an example implementation.

FIG. 6 illustrates a seabed object detection system 100. The seabed object detection system 100 can include a receiver array 105. The receiver array 105 can include a plurality of receivers 110. The plurality of receivers 110 can be disposed on a plurality of streamers 115. A streamer of the plurality of streamers 115 may be a cable (e.g., a surface marine cable), an assembly of wires, or any component capable of connecting a receiver to a recording device which may be located on a vessel 102. The receiver array 105 can include one or more receivers. For example, the receiver array 105 can include a plurality of receivers 110 coupled to a plurality of streamers 115. The receiver array 105 can include a pattern of receivers. For example, the plurality of receivers 110 can be coupled to the plurality of streamers 115 along a line. The plurality of receivers 110 of the receiver array 105 can be coupled to the plurality of streamers 115 in a grid pattern. The receiver array 105 can be the pattern formed by the plurality of receivers 110 disposed on the plurality of streamers 115. For example, the receiver array 105 can include a plurality of receivers 110 disposed along a streamer of the plurality of streamers 115. The receiver array 105 can include a plurality of receivers 110 disposed on multiple streamers of the plurality of streamers 115. The receiver array 105 can receive diffraction data diffracted off an object in the seabed.

The receiver array 105 can include a plurality of receivers 110. The plurality of receivers 110 can receive diffraction data diffracted off an object in a seabed. For example, a receiver of the plurality of receivers 110 may be a hydrophone or any other device capable of collecting seismic data. Seismic data can include reflection data indicating subsurface features of the seabed. Seismic data can include diffraction data indicating subsurface features of the seabed. The subsurface features of the seabed can include small shallow objects such as boulders. The small shallow objects can be between 10 cm and 100 cm wide (e.g., 20 cm, 30 cm, 40 cm, 50 cm, 60 cm, 70 cm, 80 cm, 90 cm, 100 cm). The small shallow objects can be greater than 100 cm. These small shallow objects can be less than 10 cm. The plurality of receivers 110 can be configured to detect acoustic waves that are reflected by seabed objects. The plurality of receivers 110 can be configured to detect acoustic waves that are diffracted by seabed objects. The plurality of receivers 110 can detect diffraction data from edges of objects. For example, the plurality of receivers 110 can detect diffraction data originating from edges of large objects. The large objects can have a volume of between 100 and 500 cubic meters (e.g., 100 cubic meters, 200 cubic meters, 300 cubic meters, 400 cubic meters, 500 cubic meters). The large objects can have a volume of less than 100 cubic meters. The large objects can have a volume of greater than 100 cubic meters. The large object can be a shipping container. The diffraction data can originate from corners of the shipping container. The plurality of receivers 110 can detect objects with irregular surface features. For example, the plurality of receivers 110 can detect objects with facets, edges, sharp boundaries, or textures. The seabed objects can be completely buried within the seabed. The seabed objects can be partially buried within the seabed.

The plurality of streamers 115 can include a central pair of streamers. The central pair of streamers can include a central port side streamer 125 and a central starboard side streamer 130. The central port side streamer 125 may be a cable (e.g., a surface marine cable), an assembly of wires, or any component capable of connecting a receiver to a recording device which may be located on the vessel 102. The recording device can receive data, such as reflection and diffraction data, from the plurality of receivers 110 disposed on the plurality of streamers 115. The central port side streamer 125 may be disposed on a port side of the vessel 102. The central starboard side streamer 130 may be a cable (e.g., a surface marine cable), an assembly of wires, or any component capable of connecting a receiver to a recording device which may be located on the vessel 102. The central starboard side streamer 130 may be disposed on a starboard side of the vessel 102.

The plurality of streamers 115 can include an auxiliary port side streamer 135. The auxiliary port side streamer 135 can be located a first distance from the central pair of streamers. For example, the auxiliary port side streamer 135 can be located a first distance from the central port side streamer 125. The auxiliary port side streamer 135 can be located a first distance from the central starboard side streamer 130. The first distance can include distances between about 5 meters and 30 meters. For example, the first distance can be 12.5 meters. The first distance can be less than 5 meters. The first distance can be greater than 30 meters. The auxiliary port side streamer 135 may be a cable (e.g., a surface marine cable), an assembly of wires, or any component capable of connecting a receiver to a recording device which may be located on the vessel 102. The auxiliary port side streamer 135 may be disposed on a port side of the vessel 102. The plurality of streamers 115 can include multiple auxiliary port side streamers 135. For example, the plurality of streamers 115 can include one, two, three, four, five, six, seven or more auxiliary port side streamers 135.

The plurality of streamers 115 can include an auxiliary starboard side streamer 140. The auxiliary starboard side streamer 140 can be located a second distance from the central pair of streamers. For example, the auxiliary starboard side streamer 140 can be located a second distance from the central port side streamer 125. The auxiliary starboard side streamer 140 can be located a second distance from the central starboard side streamer 130. The second distance can include distances between about 5 meters and 30 meters. For example, the second distance can be 12.5 meters. The second distance can be less than 5 meters. The second distance can be greater than 30 meters. The second distance can be approximately the same as the first distance. The auxiliary starboard side streamer 140 may be a cable (e.g., a surface marine cable), an assembly of wires, or any component capable of connecting a receiver to a recording device which may be located on the vessel 102. The auxiliary starboard side streamer 140 may be disposed on a starboard side of the vessel 102. The auxiliary starboard side streamer 140 can be located opposite the auxiliary port side streamer 135. The plurality of streamers 115 can include multiple auxiliary starboard side streamers 140. For example, the plurality of streamers 115 can include one, two, three, four, five, six, seven or more auxiliary starboard side streamers 140. The plurality of streamers 115 can include exactly sixteen streamers. For example, the plurality of streamers 115 can include one central port side streamer 125, one central starboard side streamer 130, seven auxiliary port side streamers 135, and seven auxiliary starboard side streamers 140.

The seabed object detection system 100 can include a port side diverter 170. The port side diverter 170 may be a diverter, a paravane or deflecting plate that redirects the motion of water past the diverter laterally to produce an amount of lateral force. The diverter can be configured to redirect flow of water past the diverter with respect to a direction of motion of the diverter through water. The diverter can include a steering device associated with the diverter. The steering device can redirect the flow of water to control an amount of lateral force generated by the diverter. The port side diverter 170 can be connected by a cable to a starboard side diverter 175. The cable can include a streamer cable 195. For example, the port side diverter 170 can be directed connected or coupled to the streamer cable 195. The port side diverter 170 can be connected or coupled to the streamer cable 195 by a coupling device or a secondary cable. The coupling device can couple the port side diverter 170 to the streamer cable 195. The streamer cable 195 can be connected to the plurality of streamers 115. The plurality of streamers 115 can be connected or coupled to the streamer cable 195 by a coupling device or a secondary cable. The coupling device can couple the streamer cable 195 to the plurality of streamers 115. The plurality of streamers 115 can be coupled to the streamer cable 195 across substantially the entire length of the streamer cable 195.

The seabed object detection system 100 can include a starboard side diverter 175. The starboard side diverter 175 may be a diverter, a paravane or deflecting plate that redirects the motion of water past the diverter laterally to produce an amount of lateral force. The diverter can be configured to redirect flow of water past the diverter with respect to a direction of motion of the diverter through water. The diverter can include a steering device associated with the diverter. The steering device can redirect the flow of water to control an amount of lateral force generated by the diverter. The starboard side diverter 175 can be connected by a cable to a port side diverter 170. The cable can include a streamer cable 195. For example, the starboard side diverter 175 can be directed connected or coupled to the streamer cable 195. The starboard side diverter 175 can be connected or coupled to the streamer cable 195 by a coupling device or a secondary cable. The coupling device can couple the starboard side diverter 175 to the streamer cable 195. The streamer cable 195 can be connected to the plurality of streamers 115. The plurality of streamers 115 can be connected or coupled to the streamer cable 195 by a coupling device or a secondary cable. The coupling device can couple the streamer cable 195 to the plurality of streamers 115. The plurality of streamers 115 can be coupled to the streamer cable 195 across substantially the entire length of the streamer cable 195.

Figure 7:
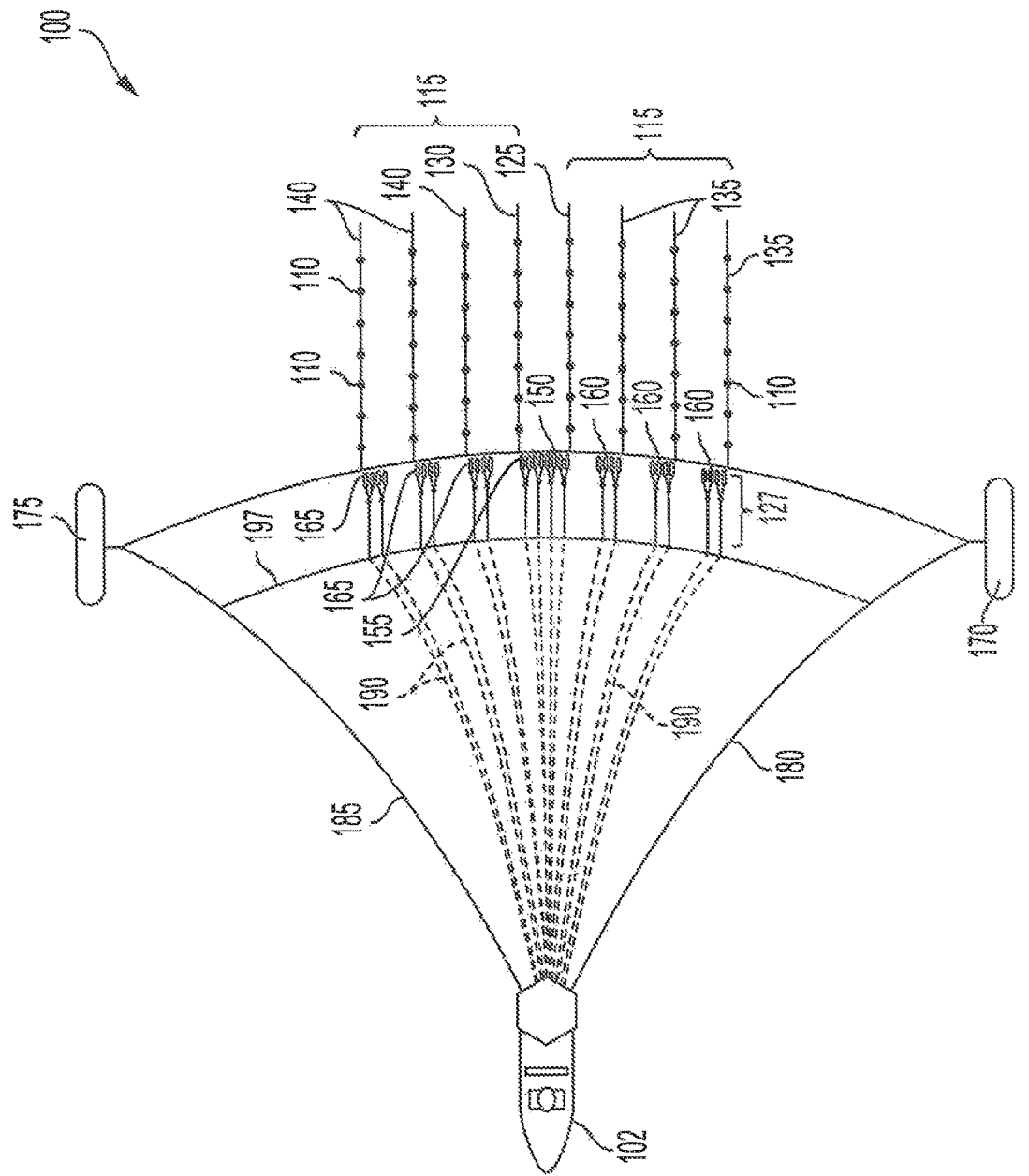
FIG. 7 illustrates a seabed object detection system according to an example implementation.

FIG. 7 illustrates a seabed object detection system 100. The seabed object detection system 100 can include a source array 127. The source array 127 can include a plurality of sources. The plurality of sources can include a central port side source 150, a central starboard side source 155, an auxiliary port side source 160, and an auxiliary starboard side source 165. A source of the plurality of sources can generate a source shot. A source of the plurality of sources can generate acoustic waves. The source array 127 can generate an acoustic signal to be received by the receiver array 105. For example, the source array 127 can include a plurality of sources coupled to a source cable 197. The source array can include a pattern of sources. The sources can include a central port side source 150, a central starboard side source 155, an auxiliary port side source 160, and an auxiliary starboard side source 165. For example, the central port side source 150, the central starboard side source 155, the auxiliary port side source 160, and the auxiliary starboard side source 165 can be coupled to the source cable 197 to form a source array 127. The source array 127 can include sixteen sources. For example, the plurality of sources can include one central port side source 150 including two sources, one central starboard side source 155 including two sources, three auxiliary port side sources 160 each including two sources, and three auxiliary starboard side sources 165 each including two sources.

The source array 127 can include at least one central pair of sources. The source array 127 can include a central pair of sources. The central pair of sources can include a central port side source 150 and a central starboard side source 155. The central pair of sources can be located between the central pair of streamers. For example, the central port side source 150 can be located between the central port side streamer 125 and the central starboard side streamer 130. The central port side source 150 can generate a source shot. The central port side source 150 can generate acoustic waves. The central port side source 150 can generate acoustic waves to be reflected off a seabed object and received by the plurality of receivers 110. The central port side source 150 can generate acoustic waves to be diffracted off a seabed object and received by the plurality of receivers 110. The central starboard side source 155 can be located between the central port side streamer 125 and the central starboard side streamer 130. The central starboard side source 155 can generate a source shot. The central starboard side source 155 can generate acoustic waves. The central starboard side source 155 can generate acoustic waves to be reflected off a seabed object and received by the plurality of receivers 110. The central starboard side source 155 can generate acoustic waves to be diffracted off a seabed object and received by the plurality of receivers 110. The central port side source 150 can include a pair of sources. The central starboard side source 155 can include a pair of sources.

The source array 127 can include at least one auxiliary port side source 160. The source array can include an auxiliary port side source 160. The auxiliary port side source 160 can be located between the central port side streamer 125 and the auxiliary port side streamer 135. The auxiliary port side source 160 can be located between a first auxiliary port side streamer 135 and a second auxiliary port side streamer 135. The auxiliary port side source 160 can generate a source shot. The auxiliary port side source 160 can generate acoustic waves. The auxiliary port side source 160 can generate acoustic waves to be reflected off a seabed object and received by the plurality of receivers 110. The auxiliary port side source 160 can generate acoustic waves to be diffracted off a seabed object and received by the plurality of receivers 110. The source array 127 can include multiple auxiliary port side sources 160. For example, the source array 127 can include one, two, three, or more auxiliary port side sources 160. The auxiliary port side source 160 can include a pair of sources.

The source array 127 can include at least one auxiliary starboard side source 165. The auxiliary starboard side source 165 can be located between the central starboard side streamer 130 and the auxiliary starboard side streamer 140. The auxiliary starboard side source 165 can be located between a first auxiliary starboard side streamer 140 and a second auxiliary starboard side streamer 140. The auxiliary starboard side source 165 can generate a source shot. The auxiliary starboard side source 165 can generate acoustic waves. The auxiliary starboard side source 165 can generate acoustic waves to be reflected off a seabed object and received by the plurality of receivers 110. The auxiliary starboard side source 165 can generate acoustic waves to be diffracted off a seabed object and received by the plurality of receivers 110. The source array 127 can include multiple auxiliary starboard side source 165. For example, the source array 127 can include one, two, three, or more auxiliary starboard side source 165. The plurality of sources can include exactly eight sources. For example, the plurality of sources can include one central port side source 150, one central starboard side source 155, three auxiliary port side sources 160, and three auxiliary starboard side sources 165. The auxiliary starboard side source 165 can include a pair of sources.

The seabed object detection system 100 can include a plurality of power cables 190. The power cable 190 can include an electrical cable to transmit electrical power. The power cable 190 can transmit electrical power from the vessel 102 to the plurality of sources of the source array 127. The power cable 190 can transmit electrical power from the vessel 102 to the central port side source 150. The power cable 190 can transmit electrical power from the vessel 102 to the central starboard side source 155. The power cable 190 can transmit electrical power from the vessel 102 to the auxiliary port side source 160. The power cable 190 can transmit electrical power from the vessel 102 to the auxiliary starboard side source 165. The power cable 190 can transmit electrical power from the vessel 102 to two sources of the central port side source 150. The power cable 190 can transmit electrical power from the vessel 102 to two sources of the central starboard side source 155. The power cable 190 can transmit electrical power from the vessel 102 to two sources of the auxiliary port side source 160. The power cable 190 can transmit electrical power from the vessel 102 to two sources of the auxiliary starboard side source 165.

Figure 8:
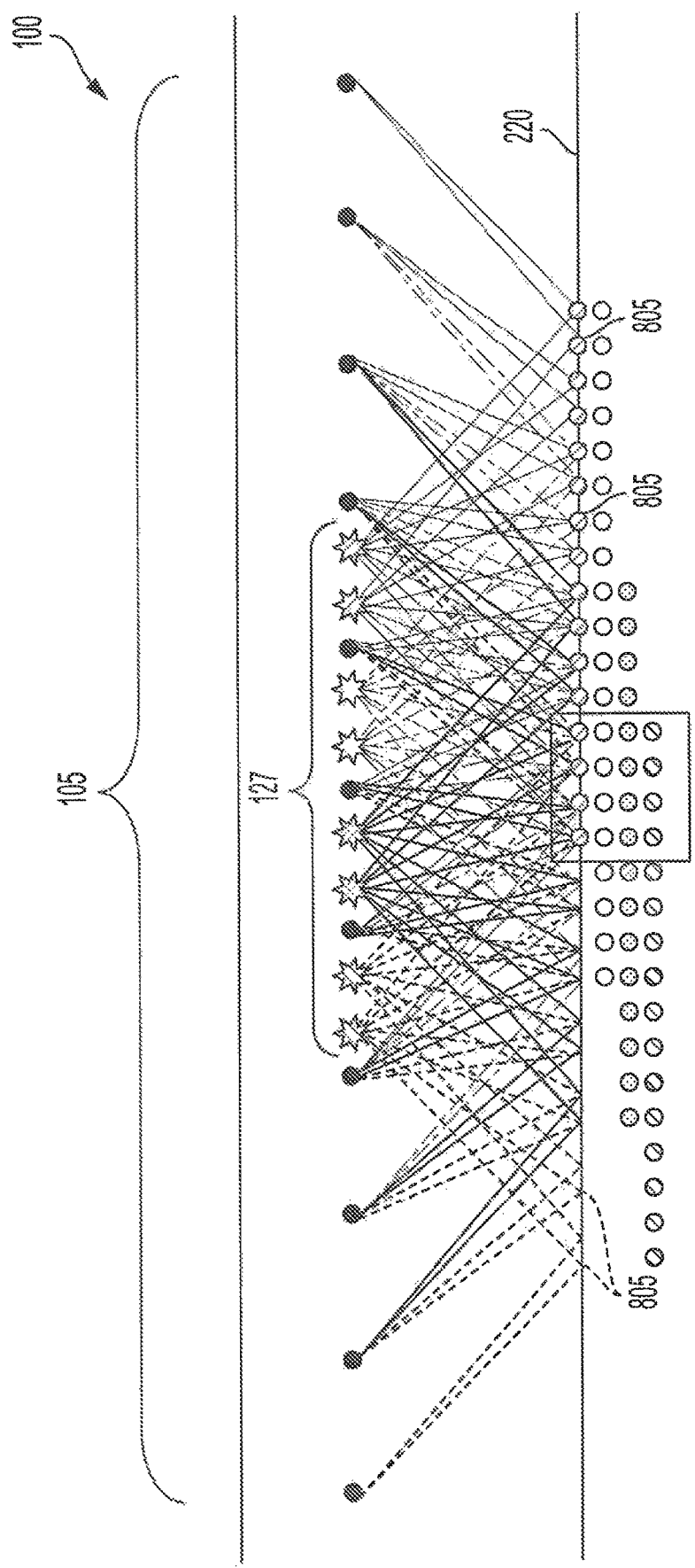
FIG. 8 illustrates a seabed object detection system according to an example implementation.

FIG. 8 illustrates a seabed object detection system 100. The seabed object detection system 100 can include a source array 127 and a receiver array 105. The seabed object detection system 100 can include two sources of the source array 127 between receivers disposed on two streamers of the plurality of streamers. The seabed object detection system 100 can include a plurality of sample points 805. The sample point 805 can be located on the seabed 220. The source array 127 and the receiver array 105 can be arranged in a pattern such at each sample point 805 is sampled four times.

Figure 9:
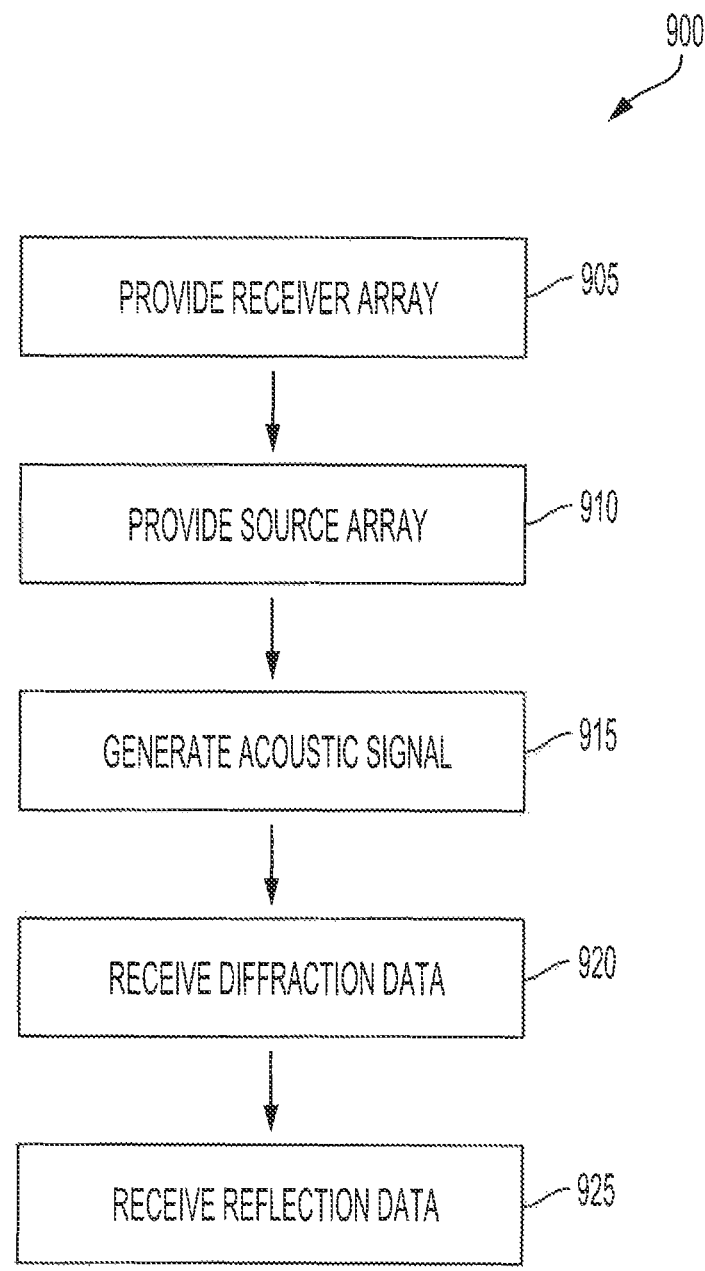
FIG. 9 illustrates a method of seabed object detection according to an example implementation.

FIG. 9 illustrates a method of seabed object detection according to an embodiment. In brief summary, the method 900 can include providing a receiver array (BLOCK 905). The method 900 can include providing a source array (BLOCK 910). The method 900 can include generating an acoustic signal (BLOCK 915). The method 900 can include receiving diffraction data (BLOCK 920). The method 900 can include receiving reflection data (BLOCK 915).

The method 900 can include providing a receiver array (BLOCK 905). The method can include providing a providing a receiver array including a plurality of receivers. The plurality of receivers can receive diffraction data diffracted off an object in a seabed. The plurality of receivers can be disposed on a plurality of streamers. The plurality of streamers can include a central pair of streamers. The central pair of streamers can include a central port side streamer and a central starboard side streamer. The plurality of streamers can include at least one auxiliary port side streamer located a first distance from the central pair of streamers. The plurality of streamers can include at least one auxiliary starboard side streamer located a second distance from the central pair of streamers opposite the at least one auxiliary port side streamer.

The method 900 can include providing a source array (BLOCK 910). The source array can include a plurality of sources. The plurality of sources can generate a source shot.

The plurality of sources can include at least one central pair of sources. The at least one central pair of sources can include a central port side source and a central starboard side source. The plurality of sources can be located between the central pair of streamers. The source array can include at least one auxiliary port side source. The at least one auxiliary port side source can be located between the central port side streamer and the at least one auxiliary port side streamer. The source array can include at least one auxiliary starboard side source. The at least one auxiliary starboard side source can be located between the central starboard side streamer and the at least one auxiliary starboard side streamer.

In some embodiments, the method 900 can include disposing at least one receiver of the plurality of receivers beyond a critical angle of reflection for at least one source of the plurality of sources. The at least one receiver can receive diffraction data responsive to an acoustic source. The critical angle can include a critical angle of reflection. The critical angle can include a critical angle of incidence. The critical angle of incidence is the angle at which a refracted wave travels along an interface between two media. A receiver of the plurality of receivers can be disposed beyond a critical angle of reflection for a source of the source array. A receiver of the plurality of receivers can be disposed beyond a critical angle of reflection for a source of the plurality of sources of the source array. The receiver disposed beyond a critical angle of reflection can receive diffraction data responsive to an acoustic source. The receiver disposed beyond a critical angle of reflection can receive diffraction data generated from a source shot. The source shot can generate acoustic waves. The receiver disposed beyond a critical angle of reflection can receive diffraction data generated from the acoustic waves.

The method 900 can include generating an acoustic signal (BLOCK 915). The method 900 can include generating, by the source array, an acoustic signal. The method can include generating, by the source array, acoustic waves. The acoustic waves can diffract off of the object in the seabed. The source array can generate acoustic waves. The acoustic waves can include a source shot. The acoustic waves can diffract off the object in the seabed. The receiver array can receive diffracted waves originating from the object in the seabed. The central pair of sources can generate acoustic waves. The central port side source can generate acoustic waves. The central starboard side source can generate acoustic waves. The auxiliary port side source can generate acoustic waves. The auxiliary starboard side source can generate acoustic waves. A receiver of the plurality of receivers of the receiver array can receive the diffracted waves. A receiver disposed on the central port side streamer can receive the diffracted waves. A receiver disposed on the central starboard side streamer can receive the diffracted waves. A receiver disposed on the auxiliary port side streamer can receive the diffracted waves. A receiver disposed on the auxiliary starboard side streamer can receive the diffracted waves.

In some embodiments, the method 900 can include towing, by a vessel, the receiver array and the source array. The method can include towing, by vessel, the receiver array 15 meters to 50 meters above the seabed. The method can include towing, by the vessel, the source array ahead of the receiver array. The vessel can tow the receiver array and the source array such that the receiver array receives diffraction data diffracted off an object in the seabed.

The method 900 can include receiving diffraction data (BLOCK 920). The method can include receiving, by the receiver array, diffraction data that includes diffracted waves originating from a seabed object and generated from a source shot. The method can include receiving, by the receiver array, diffraction data diffracted off the object in the seabed. The method can include receiving, by the receiver array, diffracted waves originating from the object in the seabed. The plurality of receivers of the receiver array can receive diffraction data. The diffraction data can include diffracted waves diffracted off a seabed object that is smaller than a Fresnel zone. The Fresnel zone is an area of a reflected from which most of the energy of a reflection is returned and arrival times of the reflection differ by less than half a period from an arrival of energy propagated from an energy source. Waves with such arrival times may interfere constructively and be detected by a single arrival. Therefore, detecting reflection waves from an object smaller than the Fresnel zone may be difficult. However, the plurality of receivers 110 of the receiver array can detect diffracted waves from an object smaller than the Fresnel zone.

The method 900 can include receiving reflection data (BLOCK 915). The method can include receiving, by the receiver array, reflection data reflected off the object in the seabed. The source array can generate a source shot. The source shot can travel through a medium (e.g., sea water) and reflect off a seabed object. The seabed object can be completed buried in the seabed. The seabed object can be partially buried in the seabed. The seabed object can include small shallow objects such as boulders. The small shallow objects can be between 10 cm and 100 cm wide (e.g., 20 cm, 30 cm, 40 cm, 50 cm, 60 cm, 70 cm, 80 cm, 90 cm, 100 cm). The small shallow objects can be greater than 100 cm. These small shallow objects can be less than 10 cm. The waves that reflect off the seabed object may include reflection data. The reflection data may include a reflected wave. The receiver array can receive reflection data. For example, the receiver array can receive the reflected wave. A receiver of the plurality of receivers can receive the reflected wave. The reflection data can include a reflected wave originating from a seabed object. The reflection data can include the reflected wave generated from a source shot. The plurality of sources of the source array can generate an acoustic signal. The plurality of receivers of the receiver array can receive reflection data reflected off the object in the seabed. The reflection data can include a reflected wave. A receiver of the plurality of receivers can receive the reflected wave reflected off the object in the seabed and generated by a source of the plurality of sources of the source array.

Embodiments of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

The operations described in this specification can be performed by a data processing apparatus on data stored on one or more computer-readable storage devices or received from other sources. The term "data processing apparatus" or "computing device" encompasses various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a circuit, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuits, subprograms, or portions of code). A computer program can be deployed to be executed on one computer or on multiple computers that are located at one site or distributed across multiple sites and interconnected by a communication network.

Processors suitable for the execution of a computer program include, by way of example, microprocessors, and any one or more processors of a digital computer. A processor can receive instructions and data from a read only memory or a random access memory or both. The elements of a computer are a processor for performing actions in accordance with instructions and one or more memory devices for storing instructions and data. A computer can include, or be operatively coupled to receive data from or transfer data to, or both, one or more mass storage devices for storing data, e.g., magnetic, magneto optical disks, or optical disks. A computer need not have such devices. Moreover, a computer can be embedded in another device, e.g., a personal digital assistant (PDA), a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The implementations described herein can be implemented in any of numerous ways including, for example, using hardware, software or a combination thereof. When implemented in software, the software code can be executed on any suitable processor or collection of processors, whether provided in a single computer or distributed among multiple computers.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

A computer employed to implement at least a portion of the functionality described herein may comprise a memory, one or more processing units (also referred to herein simply as "processors"), one or more communication interfaces, one or more display units, and one or more user input devices. The memory may comprise any computer-readable media, and may store computer instructions (also referred to herein as "processor-executable instructions") for implementing the various functionalities described herein. The processing unit(s) may be used to execute the instructions. The communication interface(s) may be coupled to a wired or wireless network, bus, or other communication means and may therefore allow the computer to transmit communications to or receive communications from other devices. The display unit(s) may be provided, for example, to allow a user to view various information in connection with execution of the instructions. The user input device(s) may be provided, for example, to allow the user to make manual adjustments, make selections, enter data or various other information, or interact in any of a variety of manners with the processor during execution of the instructions.

The various methods or processes outlined herein may be coded as software that is executable on one or more processors that employ any one of a variety of operating systems or platforms. Additionally, such software may be written using any of a number of suitable programming languages or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the solution discussed above. The computer readable medium or media can be transportable, such that the program or programs stored thereon can be loaded onto one or more different computers or other processors to implement various aspects of the present solution as discussed above.

The terms "program" or "software" are used herein to refer to any type of computer code or set of computer-executable instructions that can be employed to program a computer or other processor to implement various aspects of embodiments as discussed above. One or more computer programs that when executed perform methods of the present solution need not reside on a single computer or processor, but may be distributed in a modular fashion amongst a number of different computers or processors to implement various aspects of the present solution.

Computer-executable instructions may be in many forms, such as program modules, executed by one or more computers or other devices. Program modules can include routines, programs, objects, components, data structures, or other components that perform particular tasks or implement particular abstract data types. The functionality of the program modules can be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Any references to implementations or elements or acts of the systems and methods herein referred to in the singular can include implementations including a plurality of these elements, and any references in plural to any implementation or element or act herein can include implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementations," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. A reference to "at least one of 'A' and 'B'" can include only 'A', only 'B', as well as both 'A' and 'B'. Elements other than 'A' and 'B' can also be included.

The systems and methods described herein may be embodied in other specific forms without departing from the characteristics thereof. The foregoing implementations are illustrative rather than limiting of the described systems and methods.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A seabed object detection system, comprising:
a receiver array including a plurality of receivers, the plurality of receivers to receive diffraction data, the diffraction data indicative of acoustic waves diffracted off an object in a seabed and the plurality of receivers disposed on a plurality of streamers, the plurality of streamers including:
  a central pair of streamers including a central port side streamer and a central starboard side streamer;
  at least one auxiliary port side streamer located a first distance from the central pair of streamers; and
  at least one auxiliary starboard side streamer located a second distance from the central pair of streamers opposite the at least one auxiliary port side streamer;
a source array including a plurality of sources, the plurality of sources to generate a source shot and including:
  at least one central pair of sources, the at least one central pair of sources including a central port side source and a central starboard side source, and located between the central pair of streamers;
  at least one auxiliary port side source, the at least one auxiliary port side source located between the central port side streamer and the at least one auxiliary port side streamer; and
  at least one auxiliary starboard side source, the at least one auxiliary starboard side source located between the central starboard side streamer and the at least one auxiliary starboard side streamer; and at least one receiver of the plurality of receivers disposed beyond a critical angle of reflection for at least one source of the plurality of sources, the at least one receiver to receive diffraction data responsive to an acoustic source and the critical angle defined by an angle at which a refracted wave from the acoustic source travels along an interface between the seafloor and seawater.

2. The seabed object detection system of claim 1, comprising:
the receiver array to receive diffraction data that includes diffracted waves originating from a seabed object and generated from a source shot.

3. The seabed object detection system of claim 1, comprising:
a port side diverter; and
a starboard side diverter connected by a cable to the port side diverter, the cable connected to the plurality of streamers.

4. The seabed object detection system of claim 1, comprising:
a vessel;
a port side diverter, the port side diverter connected to the vessel by a port side cable;
a starboard side diverter, the starboard side diverter connected to the vessel by a starboard side cable;
a streamer cable connecting the port side diverter to the starboard side diverter; and
a source cable connecting the port side cable to the starboard side cable, the source cable connected to the source array.

5. The seabed object detection system of claim 1, comprising a vessel configured to tow the receiver array and the source array.

6. The seabed object detection system of claim 1, comprising a vessel configured to tow the receiver array and the source array, the source array to generate an acoustic signal and the plurality of receivers of the receiver array to receive diffraction data diffracted off the object in the seabed.

7. The seabed object detection system of claim 1, wherein the plurality of streamers comprises exactly eight streamers and the plurality of sources comprises exactly eight sources.

8. The seabed object detection system of claim 1, comprising:
the plurality of receivers to receive diffraction data diffracted off the object smaller than a Fresnel zone.

9. The seabed object detection system of claim 1, comprising:
the receiver array disposed 15 meters to 50 meters above the seabed.

10. The seabed object detection system of claim 1, comprising:
the at least one auxiliary port side source located between the central port side streamer and a midline of the central port side streamer and the at least one auxiliary port side streamer; and
the at least one auxiliary starboard side source is located between the central starboard side streamer and a midline of the central starboard side streamer and the at least one auxiliary starboard side streamer.

11. The seabed object detection system of claim 1, comprising the plurality of sources to generate an acoustic signal and the plurality of receivers of the receiver array to receive reflection data reflected off the object in the seabed.

12. The seabed object detection system of claim 1, comprising:
the source array to generate acoustic waves, the acoustic waves to diffract off of the object in the seabed; and
the receiver array to receive diffracted waves originating from the object in the seabed.

13. A method of seabed object detection, comprising:
providing a receiver array including a plurality of receivers, the plurality of receivers to receive diffraction data, the diffraction data indicative of acoustic waves diffracted off an object in a seabed and the plurality of receivers disposed on a plurality of streamers, the plurality of streamers including:
a central pair of streamers including a central port side streamer and a central starboard side streamer;
at least one auxiliary port side streamer located a first distance from the central pair of streamers; and
at least one auxiliary starboard side streamer located a second distance from the central pair of streamers opposite the at least one auxiliary port side streamer;
providing a source array including a plurality of sources, the plurality of sources to generate a source shot and including:
at least one central pair of sources, the at least one central pair of sources including a central port side source and a central starboard side source, and located between the central pair of streamers;
at least one auxiliary port side source, the at least one auxiliary port side source located between the central port side streamer and the at least one auxiliary port side streamer; and
at least one auxiliary starboard side source, the at least one auxiliary starboard side source located between the central starboard side streamer and the at least one auxiliary starboard side streamer; and
disposing at least one receiver of the plurality of receivers beyond a critical angle of reflection for at least one source of the plurality of sources, the at least one receiver to receive diffraction data responsive to an acoustic source and the critical angle defined by an angle at which a refracted wave from the acoustic source travels along an interface between the seafloor and seawater.

14. The method of claim 13, comprising:
receiving, by the receiver array, diffraction data that includes diffracted waves originating from a seabed object and generated from a source shot.

15. The method of claim 13, comprising:
towing, by a vessel, the receiver array and the source array;
generating, by the source array, an acoustic signal; and
receiving, by the receiver array, diffraction data diffracted off the object in the seabed.

16. The method of claim 13, comprising:
generating, by the source array, an acoustic signal; and
receiving, by the receiver array, reflection data reflected off the object in the seabed.

17. The method of claim 13, comprising:
generating, by the source array, acoustic waves, the acoustic waves to diffract off of the object in the seabed; and
receiving, by the receiver array, diffracted waves originating from the object in the seabed.

18. The method of claim 13, comprising:
towing, by a vessel, the receiver array 15 meters to 50 meters above the seabed.

* * * * *